United States Patent [19]
Takahashi et al.

[11] Patent Number: 5,408,559
[45] Date of Patent: Apr. 18, 1995

[54] OPTOELECTRONIC DEVICE

[75] Inventors: Shoichi Takahashi; Masando Tozawa; Atsushi Sasayama, all of Komoro; Yoshihiko Kobayashi, Kitasaku; Hideo Taguchi, Chiisagata, all of Japan

[73] Assignee: Hitachi, Ltd., Tokyo, Japan

[21] Appl. No.: 150,307

[22] Filed: Nov. 12, 1993

[30] Foreign Application Priority Data

Nov. 19, 1992 [JP] Japan .................. 4-309934

[51] Int. Cl.$^6$ .................................... G02B 6/36
[52] U.S. Cl. ............................ 385/89; 385/93
[58] Field of Search .............. 385/49, 15, 24, 31, 385/33, 34, 35, 49, 88, 89, 92, 93

[56] References Cited
U.S. PATENT DOCUMENTS 5,005,935  4/1991  Kunikane et al. ................. 385/24
5,026,137  6/1991  Tokumitsu ....................... 385/24

FOREIGN PATENT DOCUMENTS 62-237408  10/1987  Japan .
2-71205    3/1990  Japan ........................... 385/89

*Primary Examiner*—Rodney B. Bovernick
*Assistant Examiner*—John Ngo
*Attorney, Agent, or Firm*—Pennie & Edmonds

[57] ABSTRACT

In a transmitting and receiving optoelectronic device, a wave-separating filter (16) is disposed at a position deviated from 45° with respect to the optical axis of transmission light (6), or the internal wall surface of a light passage hole (15A) of a support (15) is inclined with respect to the optical axis of the transmission light (5). In another arrangement, a light-transmitting optical unit (1) and a wave-separating optical unit (13) are provided as separate units, and optical-axis adjustment is performed with only the light-transmitting optical unit (1).

16 Claims, 3 Drawing Sheets

OPTOELECTRONIC DEVICE

BACKGROUND OF THE INVENTION

The present invention relates to a two-way optical communication as well as to a transmitting and receiving optoelectronic device for a digital optical subscriber transmission system and, more particularly, to a filter separation type of transmitting and receiving optoelectronic device.

It is known that transmitting and receiving optoelectronic devices are employed for two-way optical communication, particularly, transmission and reception in digital optical subscriber transmission systems. As shown in FIG. 4 (schematic diagram), such a transmitting and receiving optoelectronic device includes, for example, a light transmitter having an LD (laser diode) element 2 and a transmission-side condenser 17 which cooperate to emit transmission light 5 of wavelength $\lambda_1$; an optical fiber 19 for guiding the transmission light 5 emitted from the light transmitter; a light receiver having a PD (photodiode) element 8 which is sensitive to reception light 12 of wavelength $\lambda_2$ passing through the optical fiber 19 (by propagation), a wave-separating filter 9 which reflects the transmission light 5 of wavelength $\lambda_1$ and transmits the reception light 12 of wavelength $\lambda_2$, and a reception-side condenser 18; a wave-separating filter 16 which transmits the transmission light 5 of wavelength $\lambda_1$ and reflects the reception light 12 of wavelength $\lambda_2$; and a wave-separating filter support 25 for supporting the wave-separating filter 16. In such a transmitting and receiving optoelectronic device, the PD element 8 is disposed at a position approximately perpendicular to the transmission light 5, while the wave-separating filter 16 is disposed at an angle of 45° with respect to the transmission light 5. In the transmitting and receiving optoelectronic device, a light passage hole 25A for guiding the transmission light 5 emitted from the light transmitter to the wave-separating filter 16 is formed in the wave-separating filter support 25. The internal wall surface of the light passage hole 25A in the wave-separating filter support 25 is formed approximately in parallel with the optical axis of the transmission light 5.

Other types of transmitting and receiving optoelectronic devices are known. One example is arranged to perform optical communication by using a signal wavelength. The transmitting and receiving optoelectronic device disclosed in Japanese Patent Laid-Open No. 237408/1987 adopts two lens systems as its focusing optical system.

SUMMARY OF THE INVENTION

The present inventor has discovered the following problems by examining the aforesaid transmitting and receiving optoelectronic device.

Improvement of the efficiency of introduction of reception light into the light receiver (PD element) and prevention of interference with the light receiver by the transmission light are considered to be important factors in determining the quality and evaluation of the aforesaid transmitting and receiving optoelectronic device.

In the aforesaid transmitting and receiving optoelectronic device, as shown in FIG. 4, the transmission light 5 of wavelength $\lambda_1$ emitted from the LD element 2 is transmitted through the transmission-side condenser 17 and the wave-separating filter 16 which transmits light of wavelength $\lambda_1$ and reflects light of wavelength $\lambda_2$, and is introduced into the optical fiber 19. In the meantime, the reception light 12 of wavelength $\lambda_2$ passing through the optical fiber 19 is reflected by the wave-separating filter 16, transmitted through the reception-side condenser 18 and the wave-separating filter 9 which transmits light of wavelength $\lambda_1$ and reflects light of wavelength $\lambda_2$, and introduced into the PD element 8.

However, any presently available filter, such as the wave-separating filter 16, cannot not perfectly transmit the light of wavelength $\lambda_1$ as it also reflects a portion thereof. Since the wave-separating filter 16 is disposed at an angle of 45° with respect to the optical axis of the transmission light 5, the reflected light appears as stray light 6 which travels in a direction opposite to and parallel to the direction in which the reception light 12 is incident on the PD element B.

The stray light 6 is again reflected by the internal wall surface of the light passage hole 25A of the wave-separating filter support 25 which is approximately parallel to the transmission light 5. The reflected light passes through the wave-separating filter 16, the reception-side focusing lens 18 and the filter 9 and is focused on the PD element 8. The wave-separating filter 9 basically serves to reflect light (the transmission light 5 and the stray light 6) of wavelength $\lambda_1$, but it is at present impossible to achieve 100% reflection. Accordingly, the reflected light (the stray light 6) is partially transmitted through the wave-separating filter 9 and focused on the PD element 8. This leads to the problem that reception noise occurs due to the stray light 6 (the interference of the transmission light with the light receiver).

In optical communication, it is strongly desirable to employ a light source capable of emitting light of low dispersion and small loss in optical fibers. For this reason, an InGaAs-based device is often used which can emit light of wavelength 1.3 μm as the wavelength $\lambda_1$ and light of wavelength 1.55 μm as the wavelength $\lambda_2$. Laser diodes for respectively emitting light of wavelength 1.3 μm and light of wavelength 1.55 μm can be manufactured from the InGaAs-based device by varying manufacturing conditions.

Although the PD element 8 is also made from the InGaAs-based device, it is at present difficult to prepare the PD element 8 as a device which is sensitive only to either one of the wavelengths 1.3 μm and 1.55 μm. It has been found, therefore, that the behavior of the stray light 6 is important since the PD element 8 has sensitivity to both wavelength 1.3 μm and wavelength 1.55 μm. The transmitting and receiving optoelectronic device which is being developed by the present inventor is required to have a characteristic of not less than 47 dB in signal-to-noise ratio (S/N), but it is impossible to satisfy such a characteristic even with the above-described wave-separating filter 9.

Further, since the light transmitter and the light receiver are present in the transmitting and receiving optoelectronic device, if the optical axis of the transmission light 5 is adjusted by moving the optical fiber 19 shown in FIG. 4, it is necessary to adjust the axis of the light receiver, with the result that the axis adjustment becomes complicated.

An object of the present invention is, therefore, to prevent interference with a light receiver by transmission light.

Another object of the present invention is to facilitate adjustment of an optical axis.

The above and other objects and novel features of the present invention will become apparent from the following description thereof, taken in conjunction with the accompanying drawings.

Representative aspects of the present invention disclosed herein will be described below in brief.

According to one aspect of the present invention, there is provided an optoelectronic device which comprises a light emitting element for emitting light having a first wavelength, a light receiving element having high sensitivity to light having a second wavelength different from the first wavelength, a filter which transmits the light having the first wavelength and reflects the light having the second wavelength, and an optical fiber. The light emitting element and the optical fiber are rectilinearly disposed with the filter interposed therebetween. The light receiving element is disposed at a position perpendicular to a straight line which connects the light emitting element and the optical fiber. The filter is set at an angle deviated from 45° with respect to a straight line which connects the light emitting element and the optical fiber.

According to another aspect of the present invention, the optoelectronic device further comprises a support which supports the filter and which has a light passage hole through which to pass the light having the first wavelength, and an internal wall surface of the light passage hole of the filter is inclined with respect to the straight line which connects the light emitting element and the optical fiber.

According to another aspect of the present invention, the optoelectronic device further comprises an aspherical lens disposed between the light emitting element and the filter, and the light having the first wavelength emitted from the light emitting element is focused on an end of the optical fiber by the aspherical lens.

According to another aspect of the present invention, in the optoelectronic device, the end of said optical fiber is inclined with respect to the straight line which connects the light emitting element and the optical fiber.

According to another aspect of the present invention, there is provided an optoelectronic device which comprises a light transmitting part having a light emitting element for emitting light having a first wavelength, an optical fiber, a wave-separating optical unit having a filter which is disposed between the light emitting element and the optical fiber and which transmits the light having the first wavelength and reflects light having a second wavelength, and a light receiving part having a light receiving element disposed at a position perpendicular to a straight line which connects the light emitting element and the optical fiber and which has high sensitivity to the light having the second wavelength different from the first wavelength. The light transmitting part and the wave-separating optical unit are provided as separate structures, and optical-axis adjustment of the light emitting element and the optical fiber is performed with the light transmitting part.

DESCRIPTION OF THE EMBODIMENTS

Figure 1:
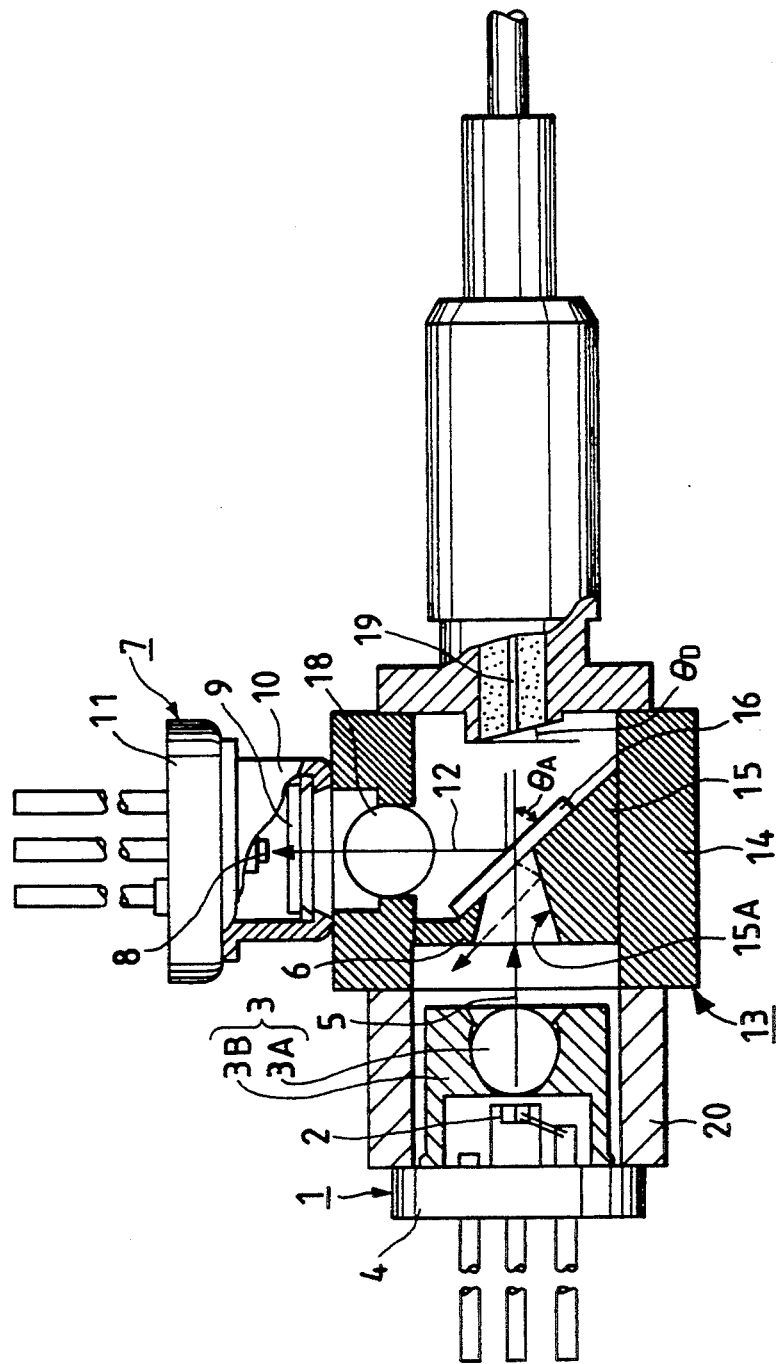
FIG. 1 is a partially cut away, cross-sectional view showing the arrangement of a transmitting and receiving optoelectronic device according to a first embodiment of the present invention.

The arrangement of the present invention will be described below with reference to embodiments of a transmitting and receiving optoelectronic device to which the present invention is applied.

Throughout the accompanying drawings which serve to explain the embodiments, the same reference numerals are used to denote parts having identical functions, and repetitive descriptions thereof are omitted.

First Embodiment

FIG. 1 is a partially cut away, cross-sectional view showing the arrangement of a transmitting and receiving optoelectronic device according to a first embodiment of the present invention.

As shown in FIG. 1, the transmitting and receiving optoelectronic device essentially includes a light transmitter 1, a light receiver 7, a wave-separating optical unit 13 and an optical fiber 19. Such a transmitting and receiving optoelectronic device is employed for two-way optical communication, particularly, transmission and reception in a digital optical subscriber transmission system.

The light transmitter 1 includes an LD (laser diode) element 2 for emitting transmission light 5 of wavelength $\lambda_1$ (for example, 1.3 $\mu$m), a stem 4 on which the LD element 2 is mounted, and an aspherical lens cap 3. The LD element 2 is airtightly enclosed in a cavity formed by the stem 4 and the aspherical lens cap 3. The aspherical lens cap 3 includes an aspherical lens 3A and a support 3B for supporting the aspherical lens 3A. The aspherical lens 3A is formed of, for example, lead glass, while the support 3B is formed of, for example, a stainless alloy. The LD element 2 is formed from a compound semiconductor substrate made of, for example, InGaAs, while the stem 4 is formed of, for example, an Fe—Ni alloy.

The light receiver 7 includes a PD (photodiode) element 8 sensitive to reception light 12 of wavelength $\lambda_2$ (for example, 1.55 $\mu$m), a stem 11 on which the PD element 8 is mounted, and a PD cap 10. The PD element 8 is airtightly enclosed in a cavity formed by the stem 11 and the PD cap 10. The PD cap 10 is provided with a wave-separating filter 9 which reflects the transmission light 5 of wavelength $\lambda_1$ and transmits the reception light 12 of wavelength $\lambda_2$. The wave-separating filter 9 is formed of, for example, barium borosilicate glass, while the PD cap 10 is formed of, for example, a Kovar alloy. The PD element 8 is formed from a compound semiconductor substrate made of, for example, InGaAs, while the stem 11 is formed of, for example, a Kovar alloy.

The wave-separating optical unit 13 includes a reception-side focusing lens 18 for focusing the reception light 12 of wavelength $\lambda_2$, a wave-separating filter 16 which transmits the transmission light 5 of wavelength $\lambda_1$ and reflects the reception light 12 of wavelength $\lambda_2$, and a support case 14 for supporting the reception-side focusing lens 18 and the wave-separating filter 16. The wave-separating filter 16 is supported on a support 15 formed integrally with the support case 14. The wave-separating filter 16 is a wavelength-selective transparent mirror, such as a half-mirror or a spectral filter. The wave-separating filter 16 is formed of, for example, barium borosilicate glass, the reception-side focusing lens 18 is formed of, for example, barium borosilicate glass, and the support case 14 is formed of, for example, an Fe—Ni alloy.

The optical fiber 19 is supported on the support case 14, and serves to transmit the transmission light 5 of wavelength $\lambda_1$ emitted from the light transmitter 1 (the LD element 2) to, for example, a remote station and to introduce the reception light 12 of wavelength $\lambda_2$ emitted from the remote station into the present device. More specifically, the structure of the transmitting and receiving optoelectronic device according to the present embodiment is such that the transmission light 5 is coupled to the optical fiber 19 via the aspherical lens (focusing optical system) 3A and the wave-separating filter 16, while the reception light 12 is coupled to the PD element 8 via the wave-separating filter 16, the reception-side focusing lens (focusing optical system) 18 and the wave-separating filter 9.

The stem 4 of the light transmitter 1 is fixed to the support case 14 with the support case 14 interposed therebetween, that is, the light transmitter 1 is fixed to the wave-separating optical unit 13 with a pipe 20 interposed therebetween. The pipe 20 is formed of, for example, a Kovar alloy and is fixed to the support case 14 by resistance welding or YAG (yttrium aluminum garnet) laser welding.

To adjust the coupling between the transmission light 5 and the optical fiber 19 along the optical axis, it is preferable to employ the pipe 20 having a length which is obtained by measuring the position at which maximum coupling can be established between the transmission light 5 and the optical fiber 19 and subtracting the optical distance of the support case 14 from the distance between the position and the top face of the stem 4. It is preferable to prepare some kinds of pipes which differ in length at a pitch of, for example, 50 $\mu$m, and select a desired one therefrom as the pipe 20. Thus, the position of the light transmitter 1 having the LD element 2 and the aspherical lens 3A and the position of the wave-separating optical unit 13 having the wave-separating filter 16 are adjusted with respect to the transmission light 5 along the optical axis. Then, the optical fiber 19 is positioned in a direction parallel to the optical axis of the transmission light 5, and is fixed to the support case 14, as by YAG laser welding.

The PD cap 10 is fixed to the support case 14, that is, the light receiver 7 is fixed to the wave-separating optical unit 13. The process of fixing the light receiver 7 to the wave-separating optical unit 13 is as follows: while light is being transmitted through the optical fiber 19 from the right side as viewed in FIG. 1, the PD cap 10 and the support case 14 are position-adjusted in the state of being maintained in sliding contact with each other, so that the maximum coupling between the reception light 12 and PD element 8 is established, and then the PD cap 10 and the support case 14 are fixed to each other, as by YAG laser welding.

In the wave-separating optical unit 13, the wave-separating filter 16 is inclined at an angle of, for example, $\theta_A=48°$ with respect to the optical axis of the transmission light 5. The optical axis of the transmission light 5 referred to herein signifies a straight line which connects the LD element 2 and the entrance end of the optical fiber 19. The wave-separating filter 16 is arranged at a position angularly deviated from the position of 45° with respect to the optical axis of the transmission light 5. By inclining the wave-separating filter 16 at an angle of $\theta_A=48°$ with respect to the optical axis of the transmission light 5 in this manner, it is possible to separate the reception light 12 from the stray light 6 which occurs due to the partial reflection of the transmission light 5 during the transmission thereof through the wave-separating filter 16. Accordingly, it is possible to prevent interference with the light receiver 7 by the transmission light 5 (the stray light 6).

In the wave-separating optical unit 13, a light passage hole 15A for guiding the transmission light 5 emitted from the light transmitter 1 to the wave-separating filter 16 is formed in the support 15 for supporting the wave-separating filter 16. The internal wall surface of the light passage hole 15A is inclined with respect to the optical axis of the transmission light 5. More specifically, the light passage hole 15A is formed in such a manner that its open area (internal diameter) closer to the aspherical lens 3A is larger than its open area (internal diameter) closer to the optical fiber 19. By inclining the internal wall surface of the light passage hole 15A with respect to the optical axis of the transmission light 5 in this manner, the angle at which the stray light 6 due to the partial reflection is reflected by the internal wall surface of the light passage hole 15A can be deviated from 90°, whereby it is possible to prevent interference with the light receiver 7 by the transmission light 5 (the stray light 6).

The entrance end of the optical fiber 19 is inclined by in angle $\theta_D$ with respect to the direction perpendicular to the transmission light 5. This inclination is intended to prevent the phenomenon in which the transmission light 5 emitted from the light transmitter 1 is transmitted through the wave-separating filter 16 and is then reflected by the entrance end of the optical fiber 19 and conducted to the wave-separating filter 16 as return light.

The operation of the first embodiment will be described below with reference to FIG. 1 as well as FIG. 2 (a schematic diagram which serves to explain the operation of the first embodiment).

Figure 2:
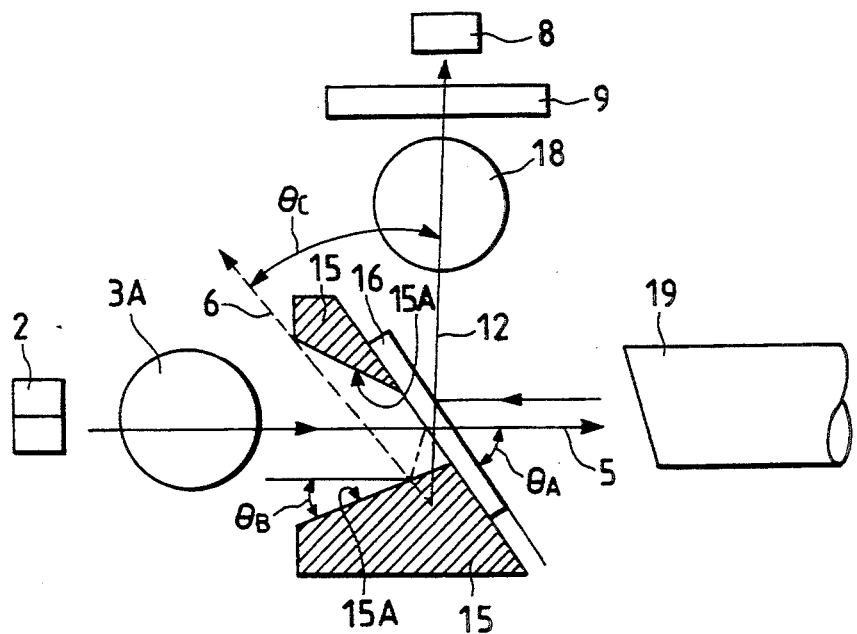
FIG. 2 is a schematic diagram showing the operation of the first embodiment of the present invention.

As shown in FIG. 2, in the transmitting and receiving optoelectronic device according to the first embodiment, the wave-separating filter 16 is disposed at the angle $\theta_A$ with respect to the transmission light 5, and the internal wall surface of the light passage hole 15A of the support 15 is inclined at an angle $\theta_B$ with respect to the transmission light 5. If the wave-separating filter 16 is disposed at the angle $\theta_A$ in this manner, the reception light 12 intersects with the optical axis or the first light path of the transmission light 5 at an angle which is slightly offset or deviated in the clockwise direction with respect to an axis perpendicular to the optical axis of the transmission light 5 by twice the amount of angular deviation from a theoretical positional angle $\theta$ (for example, $\theta=45°$) of $\theta_A$ (in the first embodiment, $\theta_A=48°$), that is, by an angle of $(\theta_A-45°)\times 2$. The deviated path forms a second light path along which light 12 from the optical fiber travels to the PD element 8.

In the meantime, the stray light 6 which has occurred due to a transmission loss in the wave-separating filter 16 similarly inclines clockwise with respect to the downward direction perpendicular to the optical axis of the transmission light 5 by twice the amount of angular deviation from the theoretical positional angle $\theta=45°$ of $\theta_A=48°$, that is, by the angle of $(\theta_A-45°)\times 2$. The stray light 6 which has occurred in this manner is reflected by the internal wall surface of the light passage hole 15A of the support 15 and appears upward as viewed in FIG. 1. The direction of the stray light 6 is inclined counterclockwise with respect to the upward direction perpendicular to the optical axis of the transmission light 5 by an angle of $\{(\theta_A-45°)\times 2+\theta_B\}\times 2$. The theoretical positional angle referred to herein signifies the theoretical angle of the wave-separating filter 16 relative to the optical axis of the transmission light 5 which theoretical angle is required to conduct the reception light 12 from the optical fiber 19 to the PD element 8.

Thus, a separation angle $\theta_C$ between the stray light 6 and the reception light 12 which is incident on the PD element 8 is given by Equation (1):

$$\theta_C=4(\theta_A-45°)+2\theta_B \quad (1)$$

(The equation (1) is satisfied under the condition that the angle $\theta_D$ of the entrance face of the optical fiber 19 is equal to 0°.)

This $\theta_C$ indicates the separation angle between the stray light 6 and the reception light 12 which is incident on the PD element 8, and represents a relationship opposite to the relationship of coupling of the stray light 6 to the PD element 8. More specifically, as the separation angle $\theta_C$ becomes larger, the coupling of the stray light 6 to the PD element 8 becomes more difficult so that it is possible to achieve prevention of interference with the light receiver 7 by the transmission light 5. Accordingly, it will be understood that if the insertion angle $\theta_A$ of the wave-separating filter 16 is deviated from 45° and if the angle $\theta_B$ of inclination of the internal wall surface of the light passage hole 15A of the support 15 from the transmission light 5 is increased, the separation angle $\theta_C$ can be increased so that it is possible to provide a method capable of effectively preventing interference with the light receiver 7 by the transmission light 5.

In the description of the first embodiment, reference has been mainly made to the prevention of the coupling of the stray light 6 to the PD element 8. However, a similar effective method can be achieved by reducing the quantity of the stray light 6. To reduce the quantity of the stray light 6, it is preferable to increase the efficiency of coupling of the transmission light 5 to the optical fiber 19 not only by improving the transmissivity of the wave-separating filter 16 relative to the transmission light 5 but also by using the aspherical lens 3A shown in FIG. 1 or the like as the transmission-side focusing lens. By increasing the efficiency of the coupling, it is possible to reduce the transmission light 5 incident on the wave-separating filter 16 so that the quantity of the stray light 6 can be reduced.

As is apparent from the foregoing description, according to the first embodiment, it is possible to easily prevent the interference with the light receiver by the transmission light.

A method of adjusting the optical axis will be described below with reference to FIG. 2 (a schematic diagram which serves to explain the operation of the first embodiment). As shown in FIG. 2, the light transmitter 1 having the LD element 2 and the aspherical lens 3A (focusing optical system) and the wave-separating optical unit 13 having the wave-separating filter 16 are arranged as separate units, and the optical axis is adjusted by moving the light transmitter 1. Accordingly, it is possible to easily perform adjustment of the optical axis.

If the transmission light 5 from the LD element 2 is to be coupled to the optical fiber 19, particularly a single-mode optical fiber, at a high efficiency by the focusing optical system, it is necessary to perform axis adjustment along the optical axis of the transmission light 5. Regarding the coupling of the PD element 8 to the optical fiber 19, since the diameter of light received by the PD element 8 is approximately 100 $\mu$m and there is a positional deviation margin of several hundred $\mu$m, it is not necessary to adjust the reception light 12 in the axial direction thereof within a part's dimensional accuracy. In other words, since it is only necessary to perform axis adjustment relative to the transmission light, iris possible to facilitate the axis adjustment of the transmitting and receiving optoelectronic device.

Second Embodiment

Figure 3:
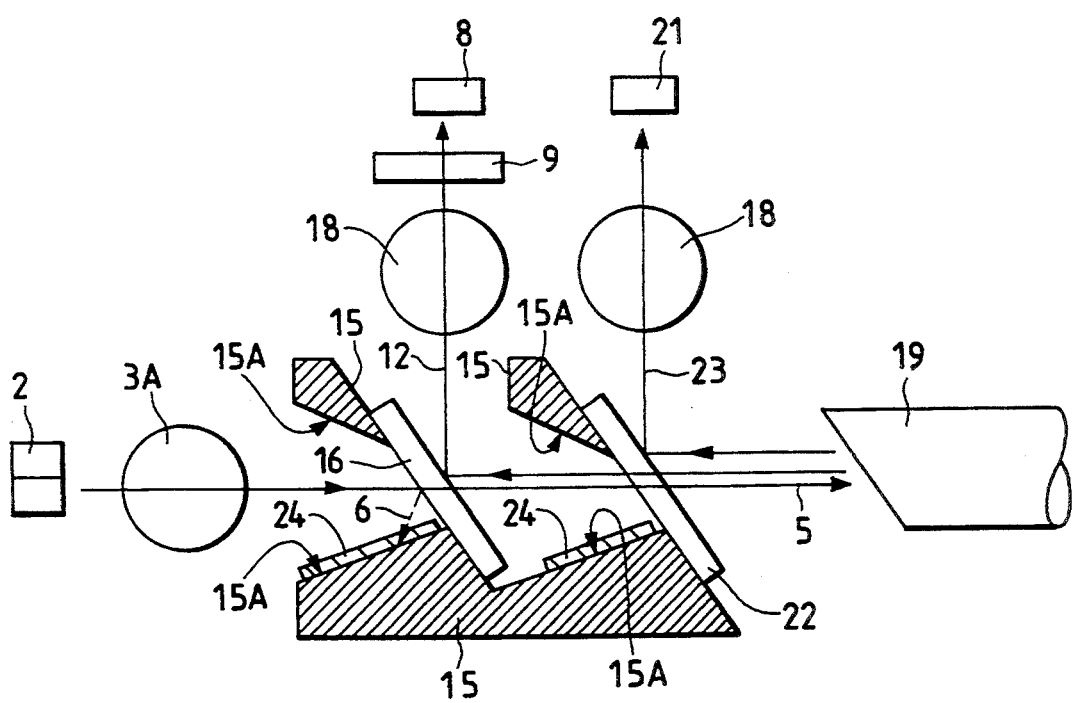
FIG. 3 is a schematic diagram showing the arrangement of a transmitting and receiving optoelectronic device according to a second embodiment of the present invention.
Figure 4:
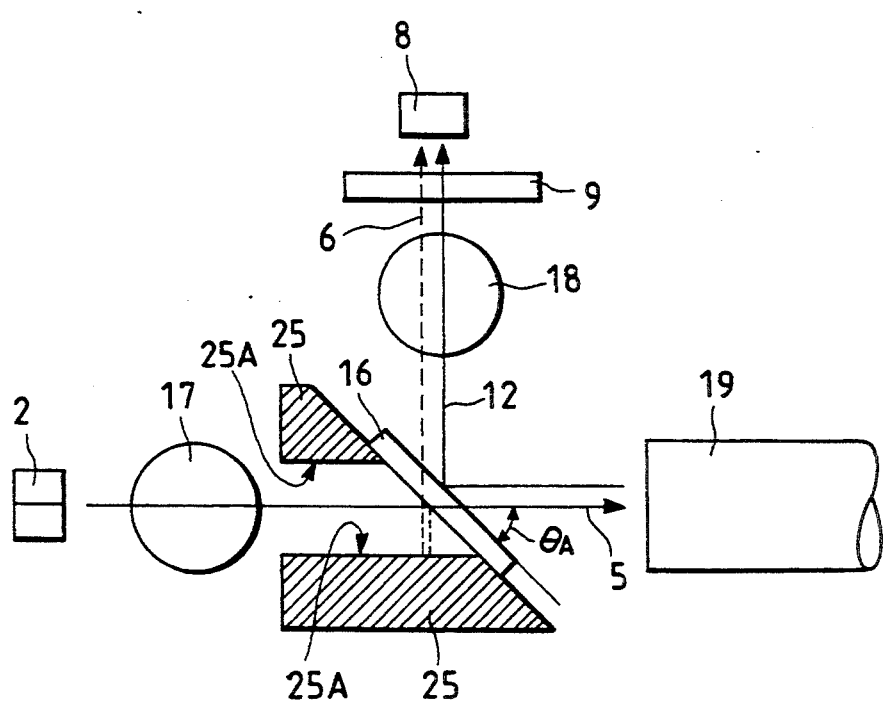
FIG. 4 is a schematic diagram which serves to explain the problems of a transmitting and receiving optoelectronic device.

FIG. 3 is a schematic view showing the arrangement of a transmitting and receiving optoelectronic device according to a second embodiment of the present invention.

As shown in FIG. 3, the transmitting and receiving optoelectronic device according to the second embodiment includes another light receiver in addition to the system used in the first embodiment (shown in FIG. 1), and are further provided with a PD element 21 having sensitivity to reception light 23 of wavelength $\lambda_3$ and a wave-separating filter 22 which transmits light of wavelength $\lambda_1$ and light of wavelength $\lambda_2$ and reflects light of wavelength $\lambda_3$. The second embodiment is a modification of the first embodiment which is intended to cope with a variety of information.

FIG. 3 shows another modification. In this modification, to reduce the quantity of the stray light 6, a light absorbing film 24 for converting light into heat is disposed on the internal wall surface of each of the light passage holes 15A of the support 15 so that it is possible to improve the effect of preventing the interference with the light receiver by the transmission light 5.

In other words, if the light absorbing film 24 or the like is formed on the internal wall surface of the light passage hole 15A of the support 15, it is possible to reduce the quantity of the stray light 6 by converting the stray light 6 into heat.

While the invention made by the present inventor has been specifically described with reference to the embodiments, the present invention is not limited to the above-described embodiments. As a matter of course, it is possible to make various modifications without departing from the scope and spirit of the present invention.

Advantages which can be achieved according to the representative aspects of the present invention disclosed herein will be described below in brief.

It is possible to separate the reception light from the stray light derived from the transmission light partially reflected by the wave-separating filter, by setting the angular position of the wave-separating filter at an angle deviated from 45° with respect to the straight line which connects the light emitting element and the optical fiber or by inclining the internal wall surface of the light passage hole in the support for the wave-separating filter with respect to the straight line which connects the light emitting element and the optical fiber.

Accordingly, it is possible to prevent the interference with the light receiver by the transmission light.

Further, by disposing the aspherical lens between the light emitting element and the wave-separating filter, it is possible to improve the coupling efficiency at which the transmission light is coupled to the optical fiber, so that it is possible to reduce the quantity of the transmission light to be produced by the light transmitter. Accordingly, the quantity of the transmission light incident on the wave-separating filter is reduced so that the quantity of the stray light derived from the transmission light can be reduced.

Further, by inclining the entrance end of the optical fiber, it is possible to deviate the reflected light (return light) of the transmission light reflected at the entrance end of the optical fiber from the optical axis of the transmission light incident on the entrance end. Accordingly, it is possible to prevent the reflected light from returning to the wave-separating filter.

Further, since the light transmitter and a wave-separating optical unit are provided as separate units and the optical axis is adjusted with only the light transmitter, it is possible to simplify an axis adjusting operation and it is possible to facilitate the operation of assembling the transmitting and receiving optoelectronic device.

What is claimed is:

1. An optoelectronic device comprising:
   an optical fiber;
   a light emitting element for emitting light to said optical fiber;
   a filter for directly transmitting light emitted from said light emitting element and for reflecting light directly from said optical fiber;
   a light receiving element for directly receiving light reflected off said filter;
   wherein said light emitting element and said optical fiber are linearly disposed along a straight line with said filter interposed therebetween, and said light receiving element disposed at a position generally perpendicular to said straight line which connects said light emitting element and said optical fiber, and said filter set an angle deviated from 45° with respect to said straight line which connects said light emitting element and said optical fiber.

2. An optoelectronic device according to claim 1, further comprising a support means which supports said filter and which has a light passageway through which light passes, wherein an internal wall surface of the light passageway of said support means is inclined with respect to the straight line which connects said light emitting element and said optical fiber.

3. An optoelectronic device according to claim 1, wherein said light emitting element is a laser diode and said light receiving element is a photodiode.

4. An optoelectronic device according to claim 1, further comprising an aspherical lens disposed between said light emitting element and said filter, wherein said aspherical lens focuses light emitted from said light emitting element onto an end of said optical fiber.

5. An optoelectronic device according to claim 1, wherein an end of said optical fiber is inclined with respect to the straight line which connects said light emitting element and said optical fiber.

6. An optoelectronic device according to claim 1, further comprising a support means which supports said filter and which has a light passageway through which light passes, wherein a light absorbing film is provided on an internal wall surface of the light passageway.

a support for supporting said filter, said support having a light passageway substantially coaxially aligned with said first light path so as to permit light emitted from said light emitting element to pass therethrough to said filter and to said optical fiber, wherein said support has means formed within said light passageway for preventing stray light reflected off said filter from entering into said light receiving element.

7. An optoelectronic device according to claim 1, wherein said light receiving element is sensitive to light emitted from said light emitting element and light from said optical fiber.

8. An optoelectronic device according to claim 7, wherein light emitted from said light emitting element has first wavelength and light from said optical fiber has a second wavelength which is different from said first wavelength.

9. An optoelectronic device comprising:
   an optical fiber;
   a light emitting element for emitting light to said optical fiber disposed along a first light path;
   a filter for transmitting light emitted from said light emitting element and for reflecting light from said optical fiber, said filter being disposed along said first light path between said optical fiber and said light emitting element, said filter being disposed at an angle relative to said first light path;
   a light receiving element disposed along a second light path for receiving light reflected off said filter, wherein said second light path intersects said first light path at an angle; and 10. An optoelectronic device according to claim 9, wherein said stray light preventing means comprises an internal wall surface of said passageway which converges toward said filter.

11. An optoelectronic device according to claim 9, wherein said stray light preventing means comprises a light absorbing film provided on said internal wall surface of said passageway.

12. An optoelectronic device according to claim 9, wherein said filter is offset from 45°.

13. An optoelectronic device according to claim 12, wherein said filter is at an angle of 48° relative to said first light path.

14. An optoelectronic device according to claim 9, wherein light emitted from said light emitting element and transmitted through said filter has a first wavelength and light from said optical fiber which is reflected off said filter has a second wavelength which is different from said first wavelength.

15. An optoelectronic device according to claim 9, wherein said first and second light paths intersect at right angles.

16. An optoelectronic device according to claim 9, wherein said first and second light paths intersect at an angle offset from right angles.

* * * * *

UNITED STATES PATENT AND TRADEMARK OFFICE
CERTIFICATE OF CORRECTION

PATENT NO. : 5,408,559
DATED : April 18, 1995
INVENTOR(S) : Takahashi et al.

It is certified that error appears in the above-identified patent and that said Letters Patent is hereby corrected as shown below:

In the claims

Col. 10, lines 8-16 delete,
Col. 10, line 39 after last paragraph insert --a support for supporting said filter, said support having a light passageway substantially coaxially aligned with said first light path so as to permit light emitted from said light emitting element to pass therethrough to said filter and to said optical fiber, wherein said support has means formed within said light passageway for preventing stray light reflected off said filter from entering into said light receiving element.--

Signed and Sealed this

Twenty-ninth Day of August, 1995

Attest:

BRUCE LEHMAN

*Attesting Officer*    *Commissioner of Patents and Trademarks*